United States Patent
Ticks et al.

(10) Patent No.: US 6,378,852 B1
(45) Date of Patent: Apr. 30, 2002

(54) DUAL-MODE TWIN-CHAMBER THRUST BEARING HAVING HYDRAULIC DAMPING

(75) Inventors: Gerd-Heinz Ticks, Waldmichelbach; Hans-Jürgen Diekmann, Rimbach, both of (DE)

(73) Assignee: Firma Carl Freudenberg, Weinheim (DE)

( * ) Notice: Subject to any disclaimer, the term of this patent is extended or adjusted under 35 U.S.C. 154(b) by 0 days.

(21) Appl. No.: 09/488,455

(22) Filed: Jan. 20, 2000

(30) Foreign Application Priority Data

Jan. 22, 1999 (DE) .......................................... 199 02 494

(51) Int. Cl.$^7$ ................................................. F16F 5/00
(52) U.S. Cl. .............. 267/140.14; 267/219; 267/140.15
(58) Field of Search ....................... 267/140.11, 140.13, 267/219, 140.12, 140.15, 140.14, 35, 140.3, 140.4, 141; 248/562, 636

(56) References Cited

U.S. PATENT DOCUMENTS

| 4,754,956 A | * | 7/1988 | Barone et al. ......... 267/140.14 |
| 4,836,515 A | * | 6/1989 | Franz et al. ................. 267/219 |
| 4,889,326 A | * | 12/1989 | Bouhours ............... 267/140.14 |
| 4,969,632 A | * | 11/1990 | Hodgson et al. ........ 267/140.11 |
| 5,209,460 A | * | 5/1993 | Bouhours et al. ...... 267/140.14 |
| 5,246,213 A | * | 9/1993 | Zup et al. .............. 267/140.14 |
| 5,344,127 A | | 9/1994 | Hettler et al. |

* cited by examiner

Primary Examiner—Christopher P. Schwartz
Assistant Examiner—Melanie Torres
(74) Attorney, Agent, or Firm—Kenyon & Kenyon

(57) ABSTRACT

A dual-mode twin-chamber thrust bearing having hydraulic damping has a working chamber and an equalizing chamber, which are separated by a partition. The chambers are hydraulically connected by a damping channel or optionally by other vibration-damping devices. The partition is provided in its center with a passage that is closable by an actuator, and the outer wall of the equalizing chamber formed by an elastic bellows. The actuator and the elastic bellows form an integral component, which is displaced by an electric motor via an actuator mechanism.

9 Claims, 1 Drawing Sheet

DUAL-MODE TWIN-CHAMBER THRUST BEARING HAVING HYDRAULIC DAMPING

FIELD OF THE INVENTION

The present invention relates generally to bearings and, more particularly, to a dual-mode twin-chamber bearing having hydraulic damping.

BACKGROUND OF THE INVENTION

A dual-mode twin-chamber bearing having hydraulic damping is particularly suited for use as an engine bearing in an engine in a motor vehicle. The bearing has a working chamber and an equalizing chamber separated by a partition. A damping channel or optionally additional vibration damping devices, hydraulically connects the chambers. The partition has a passage at its center. An actuator can close the passage, and the outer wall of the equalizing chamber is formed by bellows.

A dual-mode bearing of the type discussed here is known, for example, from U.S. Pat. No. 5,344,127, which is incorporated by reference. Reference is made to the operation of such a bearing described in that document. Bearings of this type have been successfully used for damping both low-frequency and high-frequency vibrations. When the passage in the partition is closed, high-frequency low-amplitude vibrations are damped by the design of the partition and the membrane arranged therein. As soon as the passage in the partition is opened, low-frequency vibrations are damped. The passage in the partition is closed by a piston, which is actuated by a control pressure box. The control pressure box is pneumatically actuated, vacuum being preferably applied to it when the passage is to be closed.

Developments are being pursued in the automobile industry which render vacuum pumps unnecessary. The dual-mode thrust bearing can thus no longer be equipped with vacuum chambers. Therefore, methods operating the dual-mode thrust bearing without the use of a vacuum chamber are being sought. The design of the mechanism must be simple, compact, and sturdy.

SUMMARY OF THE INVENTION

The above problem is solved by providing a dual mode thrust bearing which is actuated by an electric motor. The thrust bearing has a working chamber and an equalizing chamber. A partition separates the two chambers, and the partition has a passage closable by an actuator. A damping channel also hydraulically connects the two chambers. The outer walls of the equalizing chamber are formed by elastic bellows, and the actuator and the bellows are an integral component. An electric motor displaces the actuator via an actuator mechanism to close the passage.

The use of an electric motor is particularly advantageous, since pneumatic lines to a control pressure box, as well as the control pressure box itself, are not needed. The actuator mechanism has a simple design in that it is a cam disk connected to the shaft end of the electric motor. The actuator is pressed onto the cam disk by the slightly pressurized fluid in the equalizing chamber via the actuator plunger. This ensures that the plunger rests on the cam disk in any operating position. In order to reduce friction between the plunger and the cam disk, a ball may be arranged at their contact surfaces.

The elastic bellows forming the equalizing chamber is preferably designed as a roller bellows. The actuator is inserted in the center of this roller bellows. This can be accomplished by making the actuator a separate part which is welded to the roller bellows. It is, however, also possible to provide the roller bellows with a closing piston directed inward and a plunger directed outward connected thereto. The roller bellows can also be designed so that it has an initial stress directed outward and it attempts to press the plunger outward due to this pre-stress alone. The pre-stress will therefore cause the plunger to be pressed against the cam disk.

According to a further aspect of the invention, a gear is located between the electric motor and the cam disk. This allows a higher-speed electric motor to be used.

In order to guarantee the stability of the arrangement, it is advantageous to arrange at least part of the electric motor in a housing which can in turn be placed in the bearing cover mounted on the thrust bearing. This allows the use of the smallest possible motors.

In another embodiment of the present invention, the end of the electric motor protruding from the housing and/or the gear cladding is framed by a friction bearing, on which the cam disk is rotatably mounted. The friction bearing is in turn attached to the housing. Thus the forces from the actuator are transmitted to the housing without any bending moments. In addition, the load on the shaft end of the gear is relieved, which produces very cost-effective results.

In order to attach the cam disk to the gear shaft, the cam disk is provided with a hub-like part, which is attached to the gear shaft. The cam disk and the hub-like part form a single unit.

In order to prevent the cam disk from twisting when the motor is not in operation, it may be provided with notches, which engage correspondingly designed fillets of the plunger.

The entire assembly made up by the bearing cover, electric motor housing, electric motor, gear and the cam disk mounted on it is manufactured as a module and connected to the hydraulic part of the hydraulic bearing. As a further development of this idea, modules that can be attached to existing hydraulic bearings can also be manufactured, so that, for example, the above-described actuating mechanism having the control pressure box can be replaced by this module.

DETAILED DESCRIPTION

Figure 1:
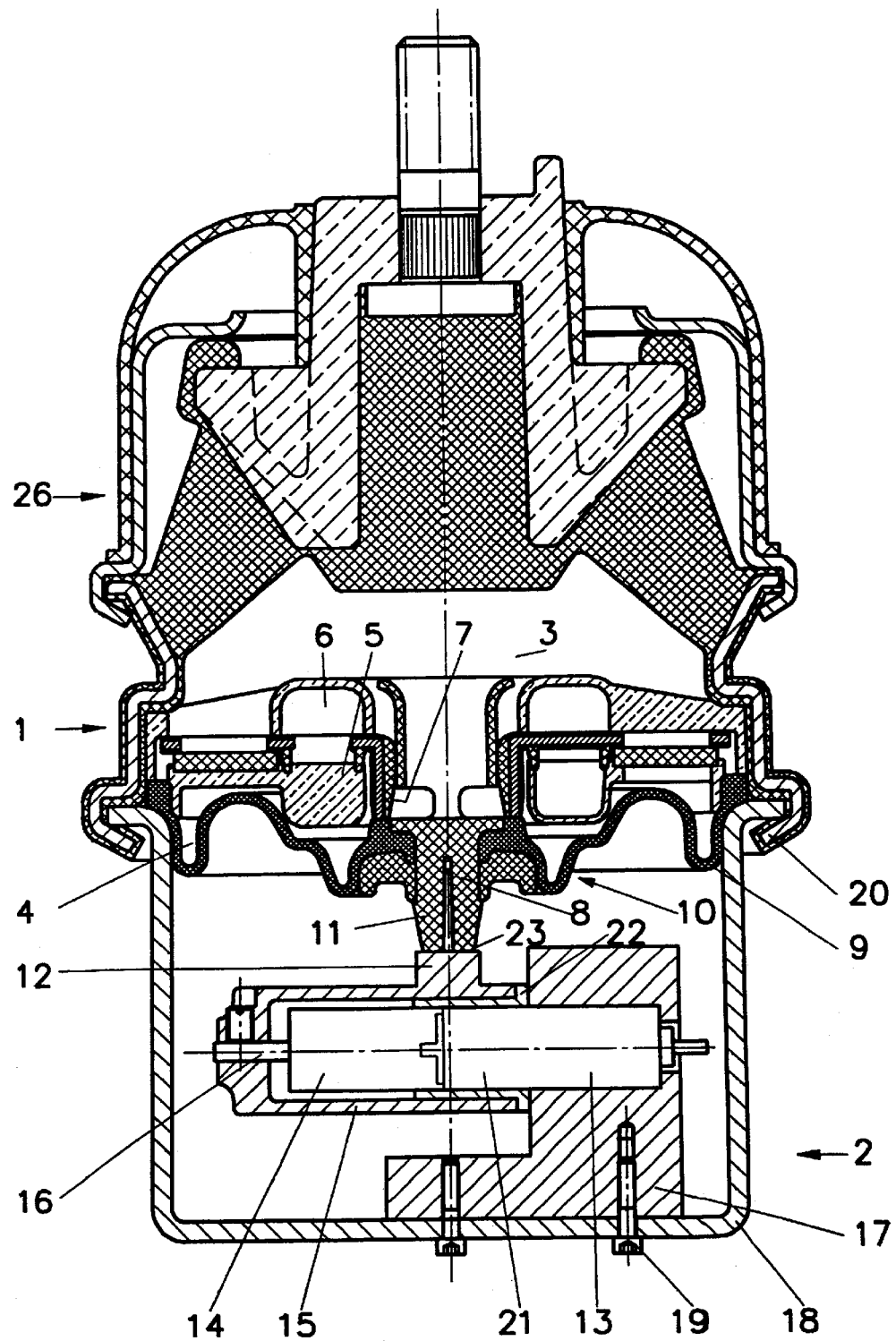
FIG. 1 is a cross-sectional view of a dual mode hydraulic bearing constructed according to the principles of the invention.

FIG. 1 shows a dual-mode twin-chamber thrust bearing 1 having hydraulic damping, which is provided with an adjustment module 2. Hydraulic part 26 of bearing 1 has working chamber 3 and equalizing chamber 4, which are separated by partition 5. Working chamber 3 and equalizing chamber 4 are connected via damping channel 6. Passage 7, which is closed by actuator 8 in the position illustrated, is located in the center of partition 5. Outer wall 9 of equalizing chamber 4 is designed as a roller bellows 9. Roller bellows 9 and actuator 8 form integrated module 10. Actuator 8 is bonded into roller bellows 9 or pressed together with it and is provided with plunger 11. Plunger 11 protrudes outward via roller bellows 9 and rests on cam disk 12. Cam disk 12 forms an actuator mechanism that is displaced by electric motor 13. The actuator mechanism can be directly connected to electric motor 13. In the present case, however, electric motor 13 is provided with a gear 14, to which cam disk 12 is connected via pot-shaped part 15 at shaft end 16 of gear 14.

Electric motor 13 is inserted in housing 17 and non-rotatably arranged therein. Housing 17 itself is attached to bearing cover 18 via screw 19. Bearing cover 18 is mounted on hydraulic part 26 of thrust bearing 1, in the present embodiment, by crimped edges 20 of hydraulic part 26. Another type of connection can, however, also be chosen here.

Electric motor 13 and gear 14 have the same overall dimensions and are directly coupled to one another. A friction bearing 22, on which cam disk 12 is rotatably mounted, is arranged on projecting end 21 of electric motor 13. Friction bearing 22 is attached to housing 17 and also partly extends over the cladding of gear 14.

Notches 23, which slightly engage with the end of plunger 11, are applied to cam disk 12. Thus plunger 11 is reliably held in place when the motor is not in operation. Alternatively, a ball can be located between plunger 11 and cam disk 12 to minimize friction.

In the embodiment shown, actuator 8 closes opening 7.

What is claimed is:

1. A dual mode twin-chamber thrust bearing for providing hydraulic damping, comprising:

a working chamber;

an equalizing chamber, the outer wall of the equalizing chamber being formed by an elastic bellows;

a partition separating the equalizing chamber from the working chamber, the partition having a passage which hydraulically connects the working chamber and the equalizing chamber, the passage being closable by an actuator that is integral to and moveable with the elastic bellows;

a damping channel which hydraulically connects the working chamber and the equalizing chamber;

an actuator mechanism for operating the actuator; and an electric motor which operates the actuator mechanism to close the passage.

2. The thrust bearing according to claim 1, wherein the actuator mechanism is a cam disk.

3. The thrust bearing according to claim 2 wherein the actuator is provided with a protruding plunger.

4. The thrust bearing according to claim 2 wherein the elastic bellows exerts a pre-stress force on the actuator in the direction of the cam disk.

5. The thrust bearing according to claim 2 further comprising:

a gear between the electric motor and the cam disk.

6. The thrust bearing according to claim 5, further comprising:

a bearing cover enclosing the hydraulic part of the thrust bearing; and wherein the electric motor is at least partly arranged in a housing, the housing located within the bearing cover.

7. The thrust bearing according to claim 6, wherein an end of the electric motor projects from the housing and is surrounded by a friction bearing on which the cam disk is rotatably mounted.

8. The thrust bearing according to claim 7, wherein the friction bearing also surrounds the gear.

9. The thrust bearing according to claim 8, wherein the electric motor, housing, gear, cam disk, and bearing cover are combined into a prefabricated module.

\* \* \* \* \*

UNITED STATES PATENT AND TRADEMARK OFFICE
CERTIFICATE OF CORRECTION

PATENT NO. : 6,378,852 B1  
DATED : April 30, 2002  
INVENTOR(S) : Ticks et al.

It is certified that error appears in the above-identified patent and that said Letters Patent is hereby corrected as shown below:

Column 4,
Line 28, change "claim 8," to -- claim 6, --.

Signed and Sealed this

Eighth Day of April, 2003

JAMES E. ROGAN
*Director of the United States Patent and Trademark Office*